United States Patent [19]

Genans

[11] Patent Number: 4,605,115

[45] Date of Patent: Aug. 12, 1986

[54] DEVICE DESIGNED TO MOVE A SECTION BEING MACHINED PAST MACHINING MEANS AND IN THE LONG DIRECTION OF THE SECTION

[75] Inventor: Michel Genans, Grenoble, France

[73] Assignees: Dufieux; Societe Nationale des Chemins de fer Francais, both of Paris, France

[21] Appl. No.: 575,129

[22] Filed: Jan. 30, 1984

[30] Foreign Application Priority Data

Feb. 1, 1983 [FR] France ................... 83 01567

[51] Int. Cl.[4] .................. B65G 43/00; B65G 47/90; B26D 5/20; B23Q 5/50

[52] U.S. Cl. .................. 198/341; 198/345; 83/151; 83/277; 83/465; 226/126; 226/163; 408/70; 408/103; 408/110; 414/753

[58] Field of Search ............ 408/69, 70, 103, 110; 83/151, 206, 277, 465; 226/120, 125, 126, 158, 162, 163, 167; 414/749, 751–753; 198/339, 341, 345

[56] References Cited

U.S. PATENT DOCUMENTS

| 1,241,251 | 9/1917 | Hawthorne | 226/126 |
|---|---|---|---|
| 1,241,265 | 9/1917 | Frelinghuysen | 226/126 |
| 2,656,588 | 10/1953 | Ovshinsky | 226/162 X |
| 2,956,666 | 10/1960 | Krynytzky | 198/339 |
| 3,090,261 | 5/1963 | Hill | 408/70 X |
| 3,094,224 | 6/1964 | Mead | 414/14 |
| 3,422,967 | 1/1969 | Aron | 414/753 |
| 3,693,683 | 9/1972 | Hurn | 408/70 X |
| 3,735,907 | 5/1973 | Kuchar et al. | 226/150 |
| 4,149,819 | 4/1979 | Kitagawa | 408/70 X |
| 4,455,726 | 6/1984 | Kawamura et al. | 408/69 X |

FOREIGN PATENT DOCUMENTS

| 1131487 | 6/1962 | Fed. Rep. of Germany . |
| 1302657 | 7/1961 | France . |
| 2168291 | 8/1973 | France . |
| 2230567 | 12/1974 | France . |

Primary Examiner—Gil Weidenfeld
Assistant Examiner—Steven C. Bishop
Attorney, Agent, or Firm—Beveridge, DeGrandi and Weilacher

[57] ABSTRACT

Device designed to move a section (2) being machined past machining means (9, 10) and in the long direction of the section so that it can be positioned with respect to the machining means, comprising at least one clamp (20) designed to grip the said section at at least one position along its length, means (27) for actuating the said clamp (20) so that it grips or releases the said section, and translation means (12, 13, 18) for moving the said clamp (20) in the lengthwise direction of the section in order to move this section past the said machining means (9, 10).

6 Claims, 3 Drawing Figures

DEVICE DESIGNED TO MOVE A SECTION BEING MACHINED PAST MACHINING MEANS AND IN THE LONG DIRECTION OF THE SECTION

The present invention relates to a device designed to move a section being machined in that section's longitudinal direction past machining means.

At present, in order to move a section to be machined past machining means in order, for example, to perform drilling operations at various locations along the section, rollers are used which carry the section to be machined and which are driven in rotation. In addition, in order to position the section being machined with respect to the machining means stops are used which are adjustable in the direction in which the section being machined is moved and against which the end of the section being machined is butted. This state of the art has many shortcomings however. Firstly it is clear that means for moving the section have to be provided and secondly means have to be provided for adjusting the position of the section with respect to the machining means. The successive adjustments of the stops do not permit the section being machined to be positioned correctly for each machining operation. In addition shocks and inaccuracies result from the end of the section being brought into contact with the preset stop by means of the drive rollers.

An object of the present invention is in particular to remedy these shortcomings and propose a device which provides a simple solution to the problem of moving a section being machined past machining means and positioning this section with respect to these machining means with accuracy even if machining operations have to be performed at different positions along the section being machined.

The device according to this invention designed to move a section being machined longitudinally past machining means, notably in order to position it with respect to the machining means, is of a design which comprises at least one clamp designed to grip the section being machined at at least one position along its length, means for actuating the said clamp so that this latter grips or releases the said section and translation means for moving the said clamp in the long direction of the said section in order to move this latter past the said machining means.

According to the present invention the said translation means may advantageously consist of a carriage carrying the said clamp and mounted so it can move along guide means running parallel to the direction of movement of the section being machined and of means for moving the said carriage along the said guide means.

The device according to this invention may also comprise a stop for the end of the said section, this stop being mounted so as to move with the said clamp in the long direction of the section.

According to this invention this stop may advantageously be mounted retractably to allow for the section to travel through the clamp.

The present invention also relates to a section machining unit consisting notably of means of supporting the section being machined and on which the section can be moved in its lengthwise direction and means of machining the section, for example transversely.

According to this invention this machining unit also comprises a carriage which is mounted to move along guide means parallel to the direction of movement of the section being machined, means for moving this carriage along the said guide means, a clamp mounted on the said carriage and designed to grip the section being machined at any spot along its length and means for operating this clamp so that it grips or releases the section being machined.

According to the present invention the carriage of this machining unit may advantageously carry a stop for the end of the section being machined, this stop being preferably mounted to be retractable so allowing the section to pass through the clamp.

The present invention will be more clearly understood on studying a section machining unit fitted with a device enabling the sections to be machined to be moved, described as a non-restrictive example and illustrated schematically in the drawings in which.

Figure 1:
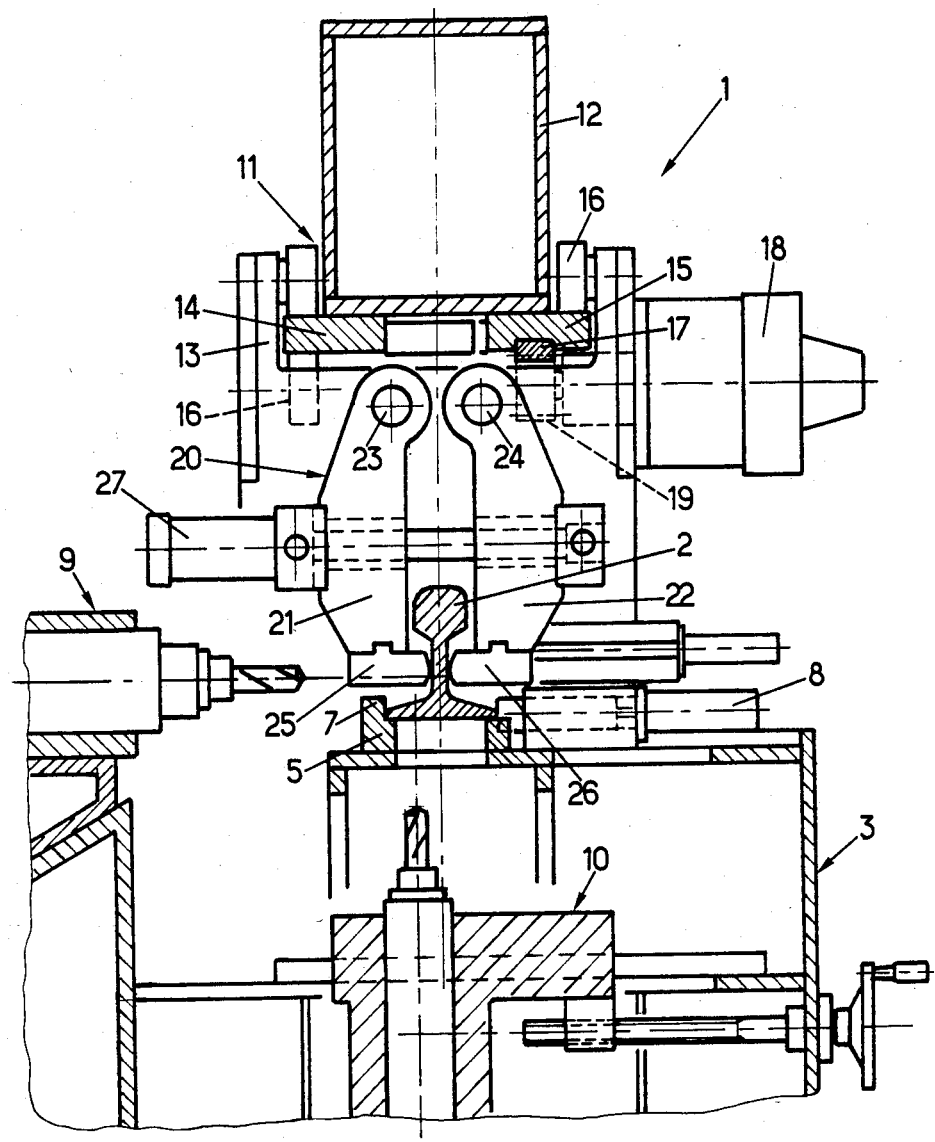
FIG. 1 shows a cross-section of the machining unit according to this invention.
Figure 3:
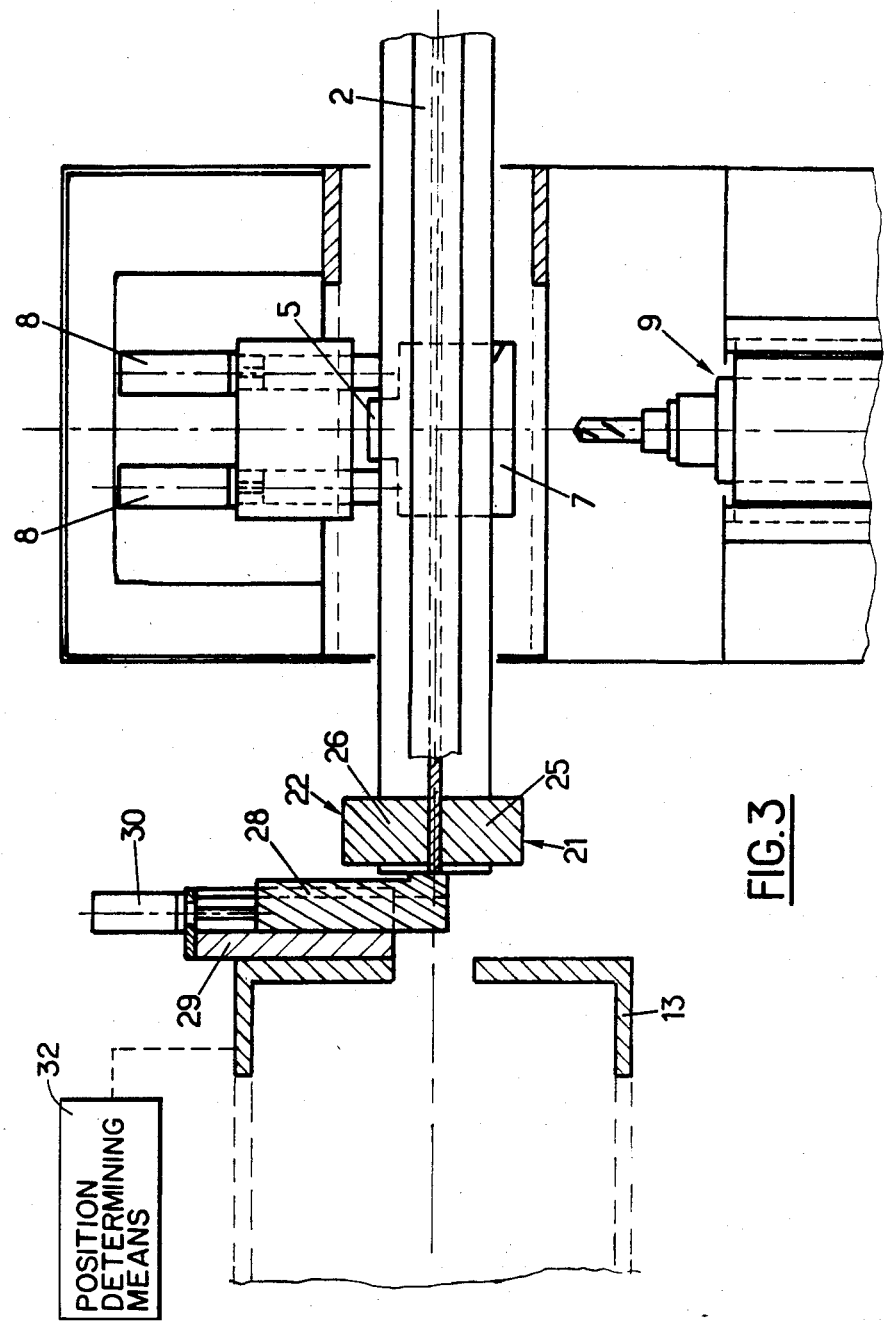

and FIG. 3 shows a part top view, partly in section, of the machining unit shown in FIG. 1.

The machining unit shown in the figures and marked overall by reference number 1 is designed to drill holes from the side and from underneath in sections 2 consisting, in the example, of rails 2.

The machining unit 1 comprises a frame marked overall by reference number 3. This frame carries a set of transverse rollers 4 with parallel axes which are mounted to rotate freely and on which the section 2 can move horizontally in the lengthwise direction.

Figure 2:
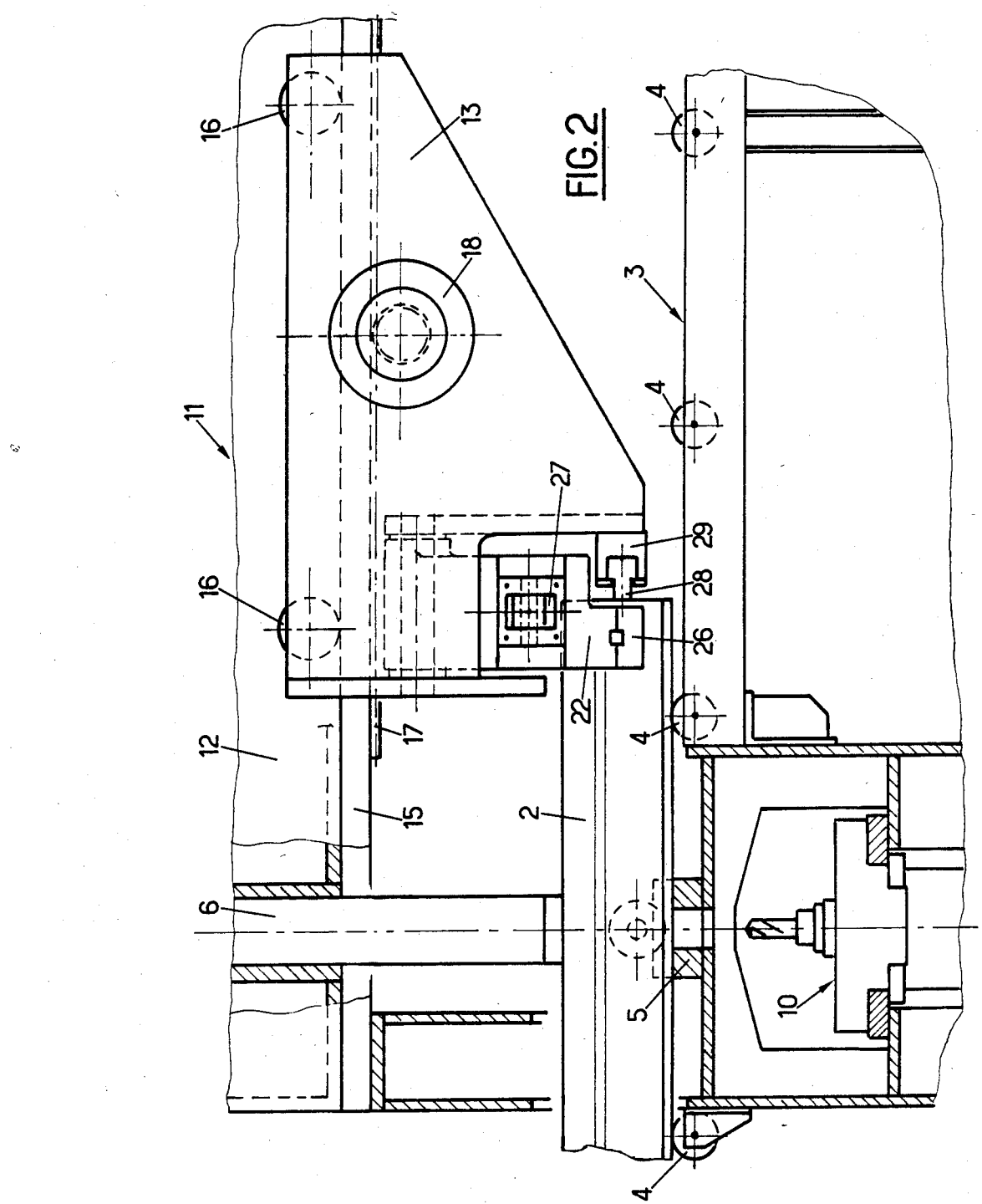
FIG. 2 shows a part section elevation view of the machining unit shown in FIG. 1.

In a zone of the runway defined by the rollers 4, between two rollers, the machining unit 1 presents a table 5 on which the section 2 can be pressed by means of a ram 6 which can be seen in part in FIG. 2. This table 5 has, on top, a side stop 7 against which one of the side edges of the bottom flange of the section 2 can be pressed by means of two rams 8 which operate transversely on the other side edge of the bottom flange of the section 2. In this way the section 2 can be suitably held in position in the zone of the table 5 in order to carry out machining operations in this zone.

In the zone of the table 5 the machining unit 1 has a drilling unit marked overall by the reference number 9 intended for drilling holes transversely and laterally in the section 2, for example in its web, as well as a drilling unit marked overall by reference number 10 and designed to drill holes from underneath and through the table 5 in the section 2. The drilling units 9 and 10 are carried by the frame 3 and are infact known per se. They do not therefore require more detailed description.

In order to move the section 2 by pulling it in the longitudinal direction over the rollers 4 and past the drilling units 9 and 10, the machining unit 1 comprises a drive and positioning unit marked overall by the reference number 11.

This device 11 comprises a horizontal beam 12 carried by the frame 3 running parallel to the direction of movement of the section 2, on the front sides of the machining zone of this section and some distance above the roller way 4, and which carries a carriage 13 movable along this beam and below it. For this purpose the beam 12 carries under and on either side of it two side slideways 14 and 15 and the carriage 13 is mounted on these slideways 14 and 15 by means of a series of wheels 16.

In order to move the carriage 13 along the beam 12 it can be seen, notably in FIG. 1, that a rack 17 has been provided fixed longitudinally to the slideway 15, as has reduction gear 18 carried by the carriage 13 whose output shaft carries a pinion 19 meshing with the rack 17.

As can be seen in FIG. 1 the carriage 13 carries underneath it a clamp marked overall by the reference number 20. This clamp 20 comprises two arms 21 and 22 which extend downwards and the upper ends of which are respectively hinged round pins 23 and 24 running in the direction of movement of the carriage 13 and the lower ends carry respectively the components 25 and 26 which protrude towards each other. In order to move the lower ends 25 and 26 of arms 21 and 22 of the clamp 20 nearer together or farther apart these arms are connected by a cylinder 27; this cylinder or ram enables the arms 21 and 22 of the clamp 20 to be moved transversely to the direction of movement of the section 2.

As can be seen in FIGS. 2 and 3, the carriage 13 also carries a stop 28 placed in front of the clamp 20, mounted on a slideway 29 carried by the carriage 13 so that it can be moved transversely to the direction of movement of the section 2 by means of a ram 30. In a first position the stop 28 lies in the direction of movement of the section 2, in front of the passage separating the arms 21 and 22 of the clamp 20, whilst in a second position it is retracted and moved away outwards.

The device 11 of the machining unit 1 can be used as follows, with the section 2 already being placed on the part of the roller way 4 located on the opposite side of the table 5 and of the machining means 9 and 10 from the carriage 13, and having its front end extending over the table 5.

After the ends 25 and 26 of the arms 21 and 22 of the clamp 20 have been moved apart by means of the ram 27 and after the stop 28 has been placed in its first position by means of ram 30, the section is moved in its long direction so that its end passes between the bottom ends 25 and 26 of the arms 21 and 22 of the clamp 20 until it comes into contact with the stop 28 carried by the carriage 13, this latter having been placed beforehand in a position close to the machining zone.

With the aid of the ram 27, the arms 21 and 22 of the clamp 20 are moved together so that their lower ends 26 and 27 come into contact with the opposite faces of the web of the section 2 so as to grip this by a pincer movement.

By moving the carriage using the motor 18 it is then possible to move the section 2 in the long direction past the machining units 9 and 10. As the position of the carriage 13, which carries the stop 28, with respect to the machining units 9 and 10 can be determined by any known means it is possible to position the section 2 in different predetermined positions in order to perform drilling operations by means of the machining units 9 and 10 located at preset distances from the end of the section 2 which bears against the stop 28. The position determining means is shown schematically at 32 in FIG. 3.

If the section 2 is very long when the carriage 13 arrives near the end of the beam 12 furthest from the machining zone the arms 21 and 22 of the clamp 20 are separated by means of the ram 27 and the stop 28 is retracted by means of the ram 30 so that the section 2 is no longer joined to the carriage 13.

Using the motor 18 the carriage 13 can then be moved until it is again placed in a position close to the machining zone and the section 2 is again gripped, by pincer action, by moving the arms 21 and 22 of the clamp 20 together by actuating the ram 27.

From this new position of the carriage 13 with respect to the section 2 the section 2 can again be fed forward by operating motor 18 in order to carry out machining operations at locations further way from the front of the section 2. As the section 2 has not changed position during the free movement of the carriage 13, the section 2 can be suitably positioned with respect to the machining units 9 and 10 since the new position of the carriage 10 with respect to the front end of the section 2 is determinable.

This operation of reworking the section 2 by moving the carriage 13 can be repeated so that the section may be of any length even if the beam 12 is of limited length.

The present invention is not limited to the example described above. Many different embodiments and applications are possible which do not lie outside the framework of this invention specified by the appended claims.

I claim:

1. A device designed to move a section being machined past machining means along a path in a longitudinal direction with respect to the section so that the section can be positioned with respect to the machining means, said section having a front end, said device comprising translation means including a carriage and means for moving said carriage in said longitudinal direction; a clamp mounted on said carriage, said clamp having arms for gripping the section transversely; clamp actuating means connected to said clamp for causing said clamp to grip or release the section; a stop also mounted on said carriage; stop actuating means connected to the stop for moving the stop on the carriage between a first position where the stop is located in the path of the section and a second position where the stop is retracted from the path of the section, said clamp and said stop moving simultaneously with said carriage so that, when said stop is in its first position and located forwardly of the section, the front end of the section is moveable in a forward direction into contact with the stop while the section lies between the arms of said clamp at a position where it is grippable by the clamp, said device being operable when said stop is in its second position so that said clamp can grip the section at any position along the length of the section away from the front end of the section, said carriage moving the section to machining positions located at preset distances from the front end of the section regardless of the length of the section.

2. The device according to claim 1 having means for determining the position of the carriage with respect to the machining means so that the section can be indexed at different predetermined positions where machining operations are performed thereon by the machining means.

3. The device according to claim 1 wherein the translation means has guide means running parallel to said longitudinal direction of movement of the section, and means for moving the carriage along the guide means.

4. The device of claim 1 wherein the movement of the stop between its first and second positions is oriented transversely to said longitudinal direction, said device having a slideway on the carriage for moving the stop between its first and second positions.

5. The device according to claim 4 wherein the translation means has guide means running parallel to said longitudinal direction of movement of the section, and means for moving the carriage along the guide means.

6. The device according to claim 5 having means for determining the position of the carriage with respect to the machining means so that the section can be indexed at different predetermined positions where machining operations are performed thereon by the machining means.

* * * * *